No. 775,152. PATENTED NOV. 15, 1904.
A. F. P. STENZY.
NOODLE MACHINE.
APPLICATION FILED SEPT. 20, 1904.
NO MODEL. 2 SHEETS—SHEET 1.
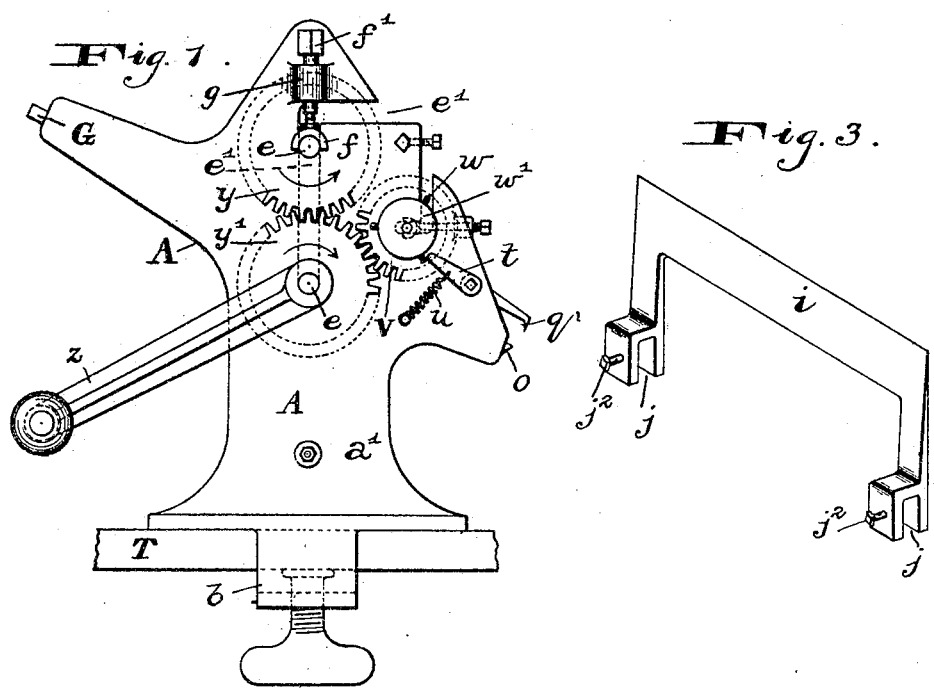
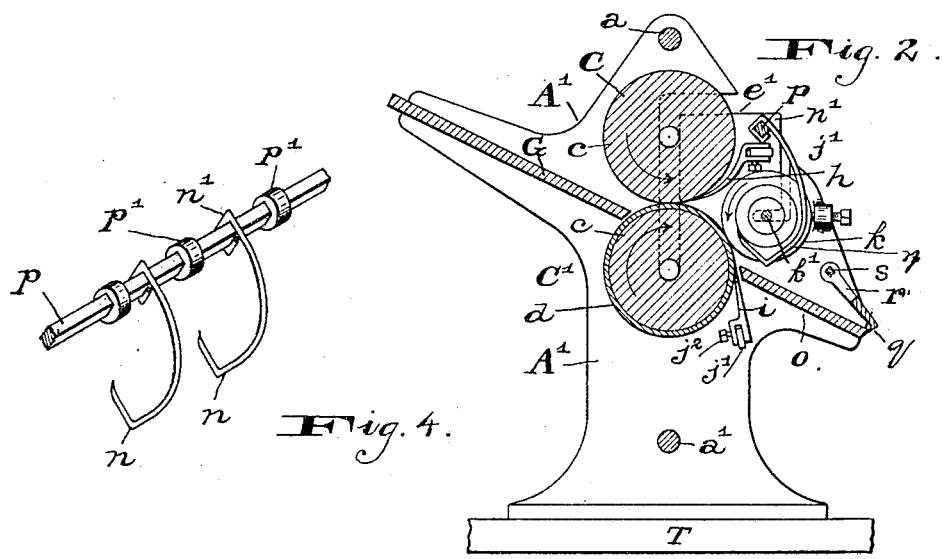
Witnesses.
J. H. Sirich Jr.
G. Ferdinand Vogt.
Inventor.
August F. P. Stenzy
By Mann & Co,
Attorneys.

No. 775,152. PATENTED NOV. 15, 1904.
A. F. P. STENZY.
NOODLE MACHINE.
APPLICATION FILED SEPT. 20, 1904.
NO MODEL. 2 SHEETS—SHEET 2.
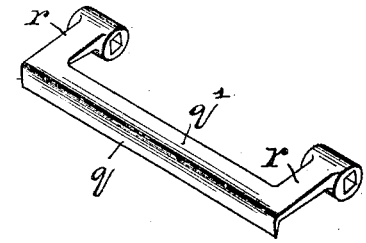
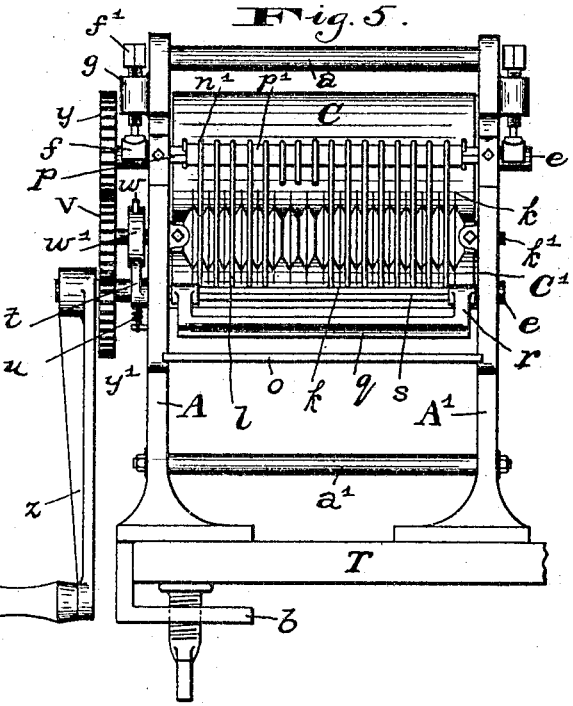
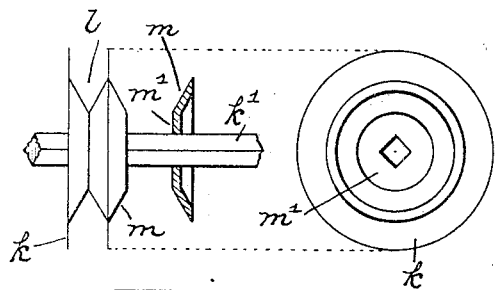
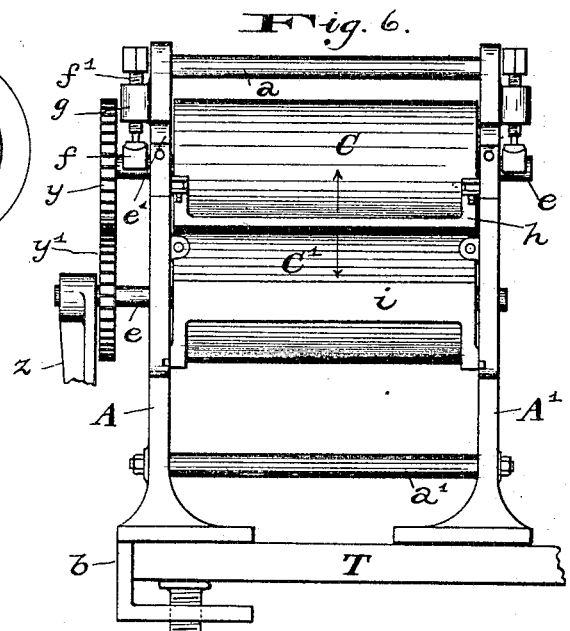
Witnesses
J. H. C. Sirich Jr.
F. Ferdinand Vogt.
Inventor.
August F. P. Stenzy
By Mann & Co,
Attorneys.

No. 775,152. Patented November 15, 1904.

UNITED STATES PATENT OFFICE.

AUGUST F. P. STENZY, OF BALTIMORE, MARYLAND, ASSIGNOR OF ONE-HALF TO MIECZYSLAW BARABASZ, OF BALTIMORE, MARYLAND.

NOODLE-MACHINE.

SPECIFICATION forming part of Letters Patent No. 775,152, dated November 15, 1904.

Application filed September 20, 1904. Serial No. 225,169. (No model.)

*To all whom it may concern:*

Be it known that I, AUGUST F. P. STENZY, a citizen of the United States, residing at Baltimore, in the State of Maryland, have invented certain new and useful Improvements in Noodle-Machines, of which the following is a specification.

This invention relates to a machine for making noodles.

The object is to provide a construction for a machine that will be both simple and cheap enough for household or domestic use.

The invention is illustrated in the accompanying drawings, in which—

Figure 1 is a side elevation of the machine. Fig. 2 is a vertical section of the machine. Fig. 3 is a view, on a larger scale, of one of the roller-scrapers. Fig. 4 is a detail view of the dough-strip diverters. Fig. 5 is a front elevation of the machine. Fig. 6 is also an elevation of the front of the machine, but without the cutting-board, knife, and rotary cutters. Fig. 7 is a perspective view of the knife. Fig. 8 shows two views of the rotary cutters.

The machine has two vertical sides A A', which are connected by rods $a$ $a'$, forming a frame. A screw-clamp $b$ is at the base to enable the machine to be secured to a table-top T. Two rollers C C' are mounted one above the other between the sides. One or both of the rollers have wood core $c$ and a metal face $d$ surrounding the core. In the present instance the lower roller only is thus constructed. The journals $e$ of these rollers are in slots $e'$, formed in the sides. Normally the upper roller will rest upon the lower one; but said upper roller will be lifted slightly by the dough when the latter presses in the form of a thin sheet between said rollers. An adjustable journal-block $f$ is above the two journals of the said upper roller. This block is held down upon said journal by the end of a screw $f'$, impinging upon said block. This screw presses through a boss $g$ on the side of the frame and is readily adjusted.

An inclined dough-table G is supported at the rear of the machine and its lower end is in such relation to the two rollers as to deliver the dough between the two rollers C C'. A scraper $h$ for the upper roller in this instance is curved and has its scraping edge in contact with the lower surface of the said upper roller C to prevent any adherence of dough. This scraper is secured in position by the same kind of means as the scraper $i$, (shown in detail in Fig. 3,) that bears in contact with the side of the lower roller C' and between said roller and the high side of the cutting-table $o$. Said scraper is a straight blade having two right-angle ends, each provided with a clip-jaw $j$ to take over a lug $j'$, fixed on each of the vertical sides A A'. A set-screw $j^2$ on the clip-jaw takes against the side lug, and thereby the scraper is held and may be adjusted.

A series of rotary disk cutters $k$ are mounted on a square shaft $k'$. These disk cutters bear against the metal face $d$ of the lower roller C'. These disks are separated from each other by a special form of spacer. (Shown plainly in Fig. 8.) The spacer has a V-groove $l$ around its periphery for a purpose presently to be described. The spacer is composed of two dish-pan shaped sheet-metal disks each having a flat center $m'$ and a sloping or flared rim $m$. These spacers are stamped into shape by dies, and a hole is in the flat center of each to take on the shaft $k'$. Two dish-pan shaped disks are placed on the shaft with their flat centers $m'$ in contact. Thus one of the flared rims $m$ bears against one cutter-disk $k$, and the other flared rim bears against the next cutter-disk, and the two flared rims form the V-groove $l$, alluded to, which works advantageously in cutting rolled dough into very slim strips, so as to make stringy noodles. The dough for noodles should first be rolled thin and then cut into very narrow or slim strips.

The fact that the dough is rolled thin and that the disk cutters are separated by very narrow spaces causes the narrow strips of dough to adhere between the perimeter cutting edges of two rotary cutters $k$, and it has been a difficult matter to devise a construction that would insure the release of these narrow strips of dough. The V-grooved spaces $l$ and the wire diverters having an angle bend $n$, as shown, so that a prong takes into said V-grooves, is an efficient device for releasing the thin dough strips and diverting them downward upon the cutting-table o. The wire diverters have their upper ends n' clipped around a square shaft p, extending across between the two sides. These clipped upper ends are spaced apart on the shaft by rings p', also on the said shaft. The wires extend from their clipped ends downward, a wire taking in each space between the disk cutters k. The stems of the diverters bend partly under the disk cutters, and at the lower end each has an angle bend n, pointing downward, from which an end prong projects upward and takes into one of the said V-grooves l. The narrow strip of dough that will adhere in the space between the rims of two rotary cutters will be released by the prong projecting up from the angle bend n, and said dough strip will be diverted downward to the slanting cutter-table o.

The knife q for cutting the dough strips into short lengths is shown in Figs. 1, 2, 5, and 7. The cutting edge q projects from a back q' at right angles, and the blade has at each end a right-angled arm r, which arms are fixed on a rock-shaft s, one end of which passes through one of the said standards A. This projecting end of rock-shaft has a knocker-arm t, and a spring u acts on said arm in manner to keep the knife q raised from the slanting table o, with the lower edge of which when the knife is depressed it has a shearing cut, as seen in Fig. 2. The shaft k', on which the rotary cutters are mounted, has its ends projecting through the said standard A and is provided with a pinion v and a knocker, consisting of spuds or pins w on a head w'. The end of the knocker-arm t has position in the circular path of the said pins w. As the said shaft and head revolve, the pins w press the end of the knocker-arm t, and thereby depress the knife q and cause it to come down along the lowermost edge of the slanting table o and cut the dough strips, which will fall below into a dish or receptacle. (Not shown.) The moment a pin w passes the knocker-arm t the latter will be drawn back by the spring u, which retains the knife.

The ends of the roller-journals e have cog-wheels y y', which are in gear, and the pinion v, which drives the rotary cutters, gears with one of said cog-wheels. A crank-arm z is attached to the journal e of the lower roller and drives the machine.

From the description here given the operation of the machine will be understood.

Having thus fully described my invention, what I claim as new, and desire to secure by Letters Patent, is—

1. A noodle-cutting machine having dough-pressing rollers, C, C'; a series of rotary disk cutters, k, mounted on a shaft; spacers also on the shaft and separating the disk cutters— each spacer having a V-groove, l, around its periphery; and a wire diverter in each space, said wire having a down-pointing angle bend, n, and an end prong projecting therefrom up into the said V-groove, as set forth.

2. The herein-described machine for cutting noodles comprising the two rollers, C, C', mounted one above the other and in contact; an upper inclined dough-table, G, at one side of said rollers to deliver dough between the rollers; a lower inclined cutting-table, o, on the opposite side of said rollers; a scraper, i, bearing against the side of the lower roller, C', and between it and the high side of the said inclined cutting-table; a series of rotary disk cutters, k, bearing against the said lower roller; wire dough-diverters between the said rotary disk cutters; and a knife, q, having an up-and-down motion and making shearing cut with the lower edge of said inclined table, as shown.

In testimony whereof I affix my signature in presence of two witnesses.

AUGUST F. P. STENZY.

Witnesses:
CHAS. B. MANN,
FELIX R. SULLIVAN.